US010250918B2

(12) United States Patent
Rullo

(10) Patent No.: US 10,250,918 B2
(45) Date of Patent: Apr. 2, 2019

(54) SYSTEMS AND METHODS FOR PRESENTING AMBIENT CONTENT ON A TELEVISION DISPLAY

(71) Applicant: Disney Enterprises, Inc., Burbank, CA (US)

(72) Inventor: Marc Rullo, East Brunswick, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/254,882

(22) Filed: Sep. 1, 2016

(65) Prior Publication Data

US 2018/0063560 A1 Mar. 1, 2018

(51) Int. Cl.
| | | |
|---|---|---|
| *H04N 21/81* | (2011.01) | |
| *H04N 21/234* | (2011.01) | |
| *H04N 21/61* | (2011.01) | |
| *H04N 21/431* | (2011.01) | |
| *H04N 21/258* | (2011.01) | |
| *H04N 21/45* | (2011.01) | |
| *H04N 21/485* | (2011.01) | |

(52) U.S. Cl.
CPC . *H04N 21/23424* (2013.01); *H04N 21/25883* (2013.01); *H04N 21/25891* (2013.01); *H04N 21/4312* (2013.01); *H04N 21/4532* (2013.01); *H04N 21/4854* (2013.01); *H04N 21/6125* (2013.01); *H04N 21/8126* (2013.01); *H04N 21/8153* (2013.01)

(58) Field of Classification Search
CPC .................................................. H04N 21/8153
See application file for complete search history.

(56) References Cited

U.S. PATENT DOCUMENTS

| | | | |
|---|---|---|---|
| 9,685,802 B1* | 6/2017 | Mirov | H02J 7/0044 |
| 2001/0040568 A1* | 11/2001 | Park | G09G 5/006 |
| | | | 345/211 |
| 2007/0143493 A1* | 6/2007 | Mullig | G06F 17/30017 |
| | | | 709/232 |
| 2008/0134063 A1* | 6/2008 | Volach | H04L 51/04 |
| | | | 715/762 |
| 2009/0174717 A1* | 7/2009 | Salisbury | G06Q 10/10 |
| | | | 345/473 |
| 2009/0320055 A1* | 12/2009 | Langille | H04H 20/42 |
| | | | 725/14 |
| 2012/0151527 A1* | 6/2012 | Kumar | G06N 5/047 |
| | | | 725/40 |
| 2016/0094884 A1* | 3/2016 | Westbrook | H04N 21/44218 |
| | | | 725/38 |

* cited by examiner

*Primary Examiner* — Michael H Hong
(74) *Attorney, Agent, or Firm* — Farjami & Farjami LLP

(57) ABSTRACT

There is provided television comprising a television display, a memory storing an executable code, a processor executing the executable code to receive an input selecting an ambient mode from a plurality of modes, including an on mode, an off mode and the ambient mode, wherein in the ambient mode the television display is on for presenting ambient content and not for presenting regular television content, request the ambient content from a server based on one of a default setting, a user profile, a user history, and a user preference, receive, in response to the request, the ambient content from the server, passively present the ambient content on the television display by periodically refreshing the ambient content from the server and periodically refreshing the ambient content on the television display without a user interaction.

20 Claims, 3 Drawing Sheets

SYSTEMS AND METHODS FOR PRESENTING AMBIENT CONTENT ON A TELEVISION DISPLAY

BACKGROUND

For generations, television has been the centerpiece of the American living room, and is used to watch television programs for entertainment and information. Typically, a user turns on the television to watch a television program, and when the program is over, the user turns the television off. The television sits dormant while not in use, and users increasingly interact with other electronic devices, such as smartphones and tablet, while not watching the television.

SUMMARY

The present disclosure is directed to systems and methods for presenting ambient content on a television display, substantially as shown in and/or described in connection with at least one of the figures, as set forth more completely in the claims.

DETAILED DESCRIPTION

Figure 1:
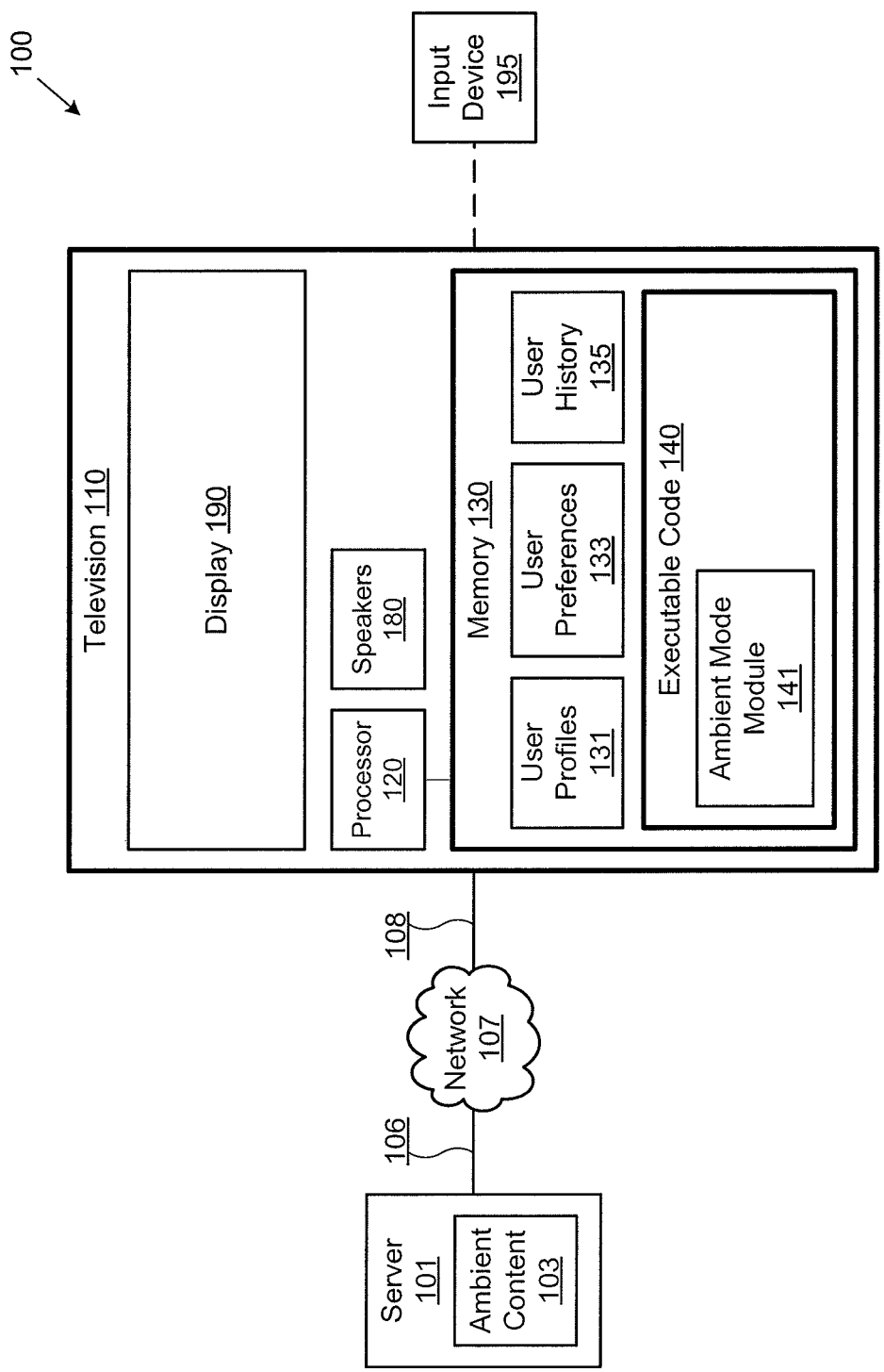
FIG. 1 shows a diagram of an exemplary system for presenting ambient content on a television display, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for presenting ambient content on a television display, according to one implementation of the present disclosure. Diagram 100 shows server 101, connection 106, network 107, connection 108, television 110, and input device 195. Server 101 may be a network-connected server storing information and content, including ambient content 103, for access over network 107. In one implementation, ambient content 103 may include news information, such as headlines, story summaries, breaking news, etc. In one implementation, ambient content 103 may include live video streams, such as video streams showing cities around the world, outdoor scenes from around the world, e.g., the African savanna, Hawaiian beaches, or video streams showing animals and wildlife, such as a video stream of an eagle's nest with hatchlings.

In other implementations, ambient content 103 may include location-based information, such as current temperature information and/or weather forecast information, etc. For example, ambient content 103 may include a widget for displaying the local weather forecast on display 190. In one implementation, ambient content 103 may include vendor and/or sponsor information related to a user's interests and/or other ambient content. Network 107 may be a computer network, such as the Internet. In some implementations, server 101 may be connected to network 107 by connection 106, and television 110 maybe connected to network 107 by connection 108.

Television 110 may be a television or set-top-box having Internet connectivity. In some implementations, television 110 may include integrated Internet and Web 2.0 features, where web 2.0 may describe World Wide Web sites that emphasize user-generated content, usability, and interoperability. As shown in FIG. 1, television 110 includes processor 120, memory 130, speakers 180, and display 190. Processor 120 is a hardware processor, such as a central processing unit (CPU), found in computing devices. Memory 130 is a non-transitory storage device for storing computer code for execution by processor 120, and also for storing various data and parameters. As shown in FIG. 1, memory 130 includes user profiles 131, user preferences 133, user history 135, and executable code 140.

User profiles 131 may include information about one or more users of television 110. In some implementations, user profiles 131 may include information about each user, such as whether the user is male or female, the age of the user, favorite activities of the user, such as outdoor activities, cooking, etc. User profiles 131 may include information such as favorite bands, political affiliations, and other information about each user of television 110. User preferences 133 may include settings such as a preferred format of ambient content presentation. For example, the user may prefer ambient content 103 including news headlines to be presented as text, simply listing the headlines, as a headline and a short summary of the news story, as a headline and a related thumbnail image, etc. User preferences 133 may include the user's preferred type of ambient content 103, such as news content, entertainment content, video streaming content, such as live streaming video of wildlife, etc.

User history 135 may include a viewing activity of one or more users of television 110. In some implementations, user history 135 may include television programs viewed and/or Internet activity of the one or more users of television 110. Viewing history of television programs may include which television programs have been viewed, whether the television programs were viewed in their entirety, whether a user changed to another television program or Internet content before the end of a television program, whether a user adjusted the volume, either up or down, during a television content, etc.

Executable code 140 may include one or more software modules for execution by processor 120. As shown in FIG. 1, executable code 140 includes ambient mode module 141. Ambient mode module 141 is a software module stored in memory 130 for execution by processor 120 to present ambient content 103 on television 110. In some implementations, ambient mode module 141 may present ambient content 103 to a user on television 110. Ambient content 103 may be presented based on one or more of user profiles 131, user preferences 133, and/or user history 135. Ambient mode module 141 may request ambient content 103 from server 101 and present ambient content 103 to the user using speakers 180, display 190, etc. In one implementation, executable code 140 may enter ambient mode in response to receiving an input from input device 195 selecting ambient mode from a plurality of modes including on mode, off mode and ambient mode. The on mode and the off mode are the conventional modes of operating the television. For example, to enter the on mode, the television is powered on to manually select a particular programming channel and manually surf through the programming channels. In the off mode, the television is turned off. In one implementation, executable code 140 may enter ambient mode after television 110 has been dormant for a period of time, such as when television 110 has not received an input from input device 195 for more than sixty minutes. In one implementation, when a user powers on television 110 from either being completely off or in a standby state, television 110 may power up into ambient mode. Ambient mode may allow a user to be exposed to ambient content 103 without actively interacting with television 110. In some implementations, ambient mode module 141 may allow a user to interact with one or more elements of ambient content 103 on display 190. In one implementation, the user may interact with ambient content 103 without exiting ambient mode.

For example, a user may turn on television 110, select ambient mode, and then sit down to read. Every once in a while, the user may glance up at display 190 to see a live video stream of the skyline of Seoul, South Korea. The user may be interested in this topic because the user recently read about topics related to Korea. The user may get up to leave the room, and when the user returns, the user may notice a breaking news alert at the bottom of the display 190 related to Korea. The user may pick up the remote and choose to view the breaking news update. In response to the user selecting the breaking news link, ambient mode module 141 may play a news video in a window overlaid on top of ambient content 103. The user may be intrigued and decide to exit ambient mode and view the news video full-screen on display 190. Exiting ambient mode may increase the brightness of display 190 and increase the volume of the news video.

Figure 2:
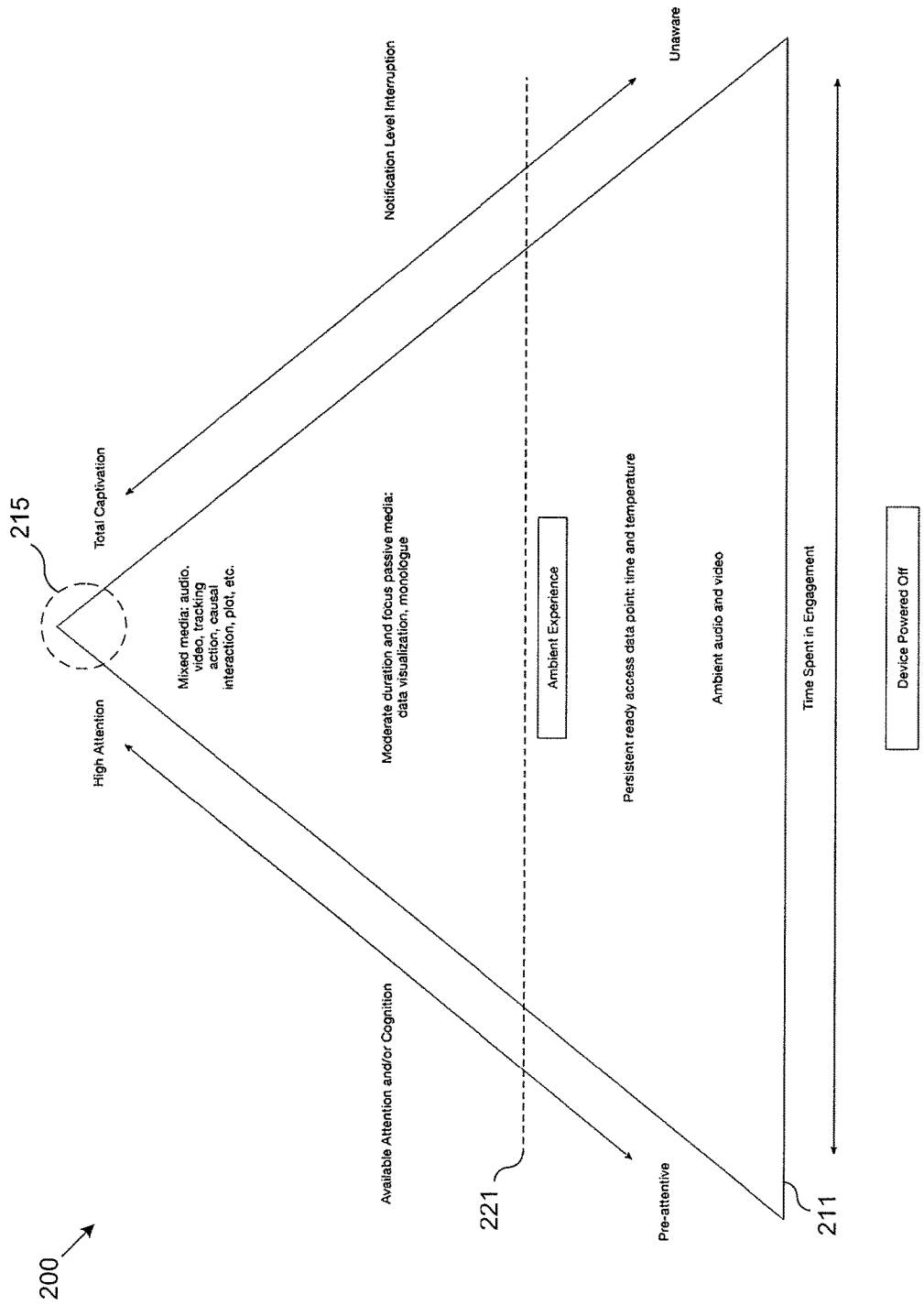
FIG. 2 shows a diagram of the cognitive differences between normal television and presentation of information in ambient mode, according to one implementation of the present disclosure.

FIG. 2 shows a diagram of the cognitive differences between normal television and presentation of information in ambient mode, according to one implementation of the present disclosure. Diagram 200 provides a visual representation of the amount of time a user may spend engaging with television 110 based on the user's available attention and/or cognition, and a notification level interruption. Apex 215 of diagram 200 represents content to which the user will pay undivided attention, involving the highest level of attention from the user. Such content may include headline segments of the nightly news, television programming, movies, etc. As content displayed on television 110 moves from apex 215 towards the base of the triangle in diagram 200, the content may require less attention from the user, and presentation of the content may cause less interruption. When the attention level and notification level cross threshold 221, the content may be considered ambient content. Base 211 of diagram 200 represents ambient content requiring the least amount of attention from the user and causing the least amount of interruption to the user.

Figure 3:
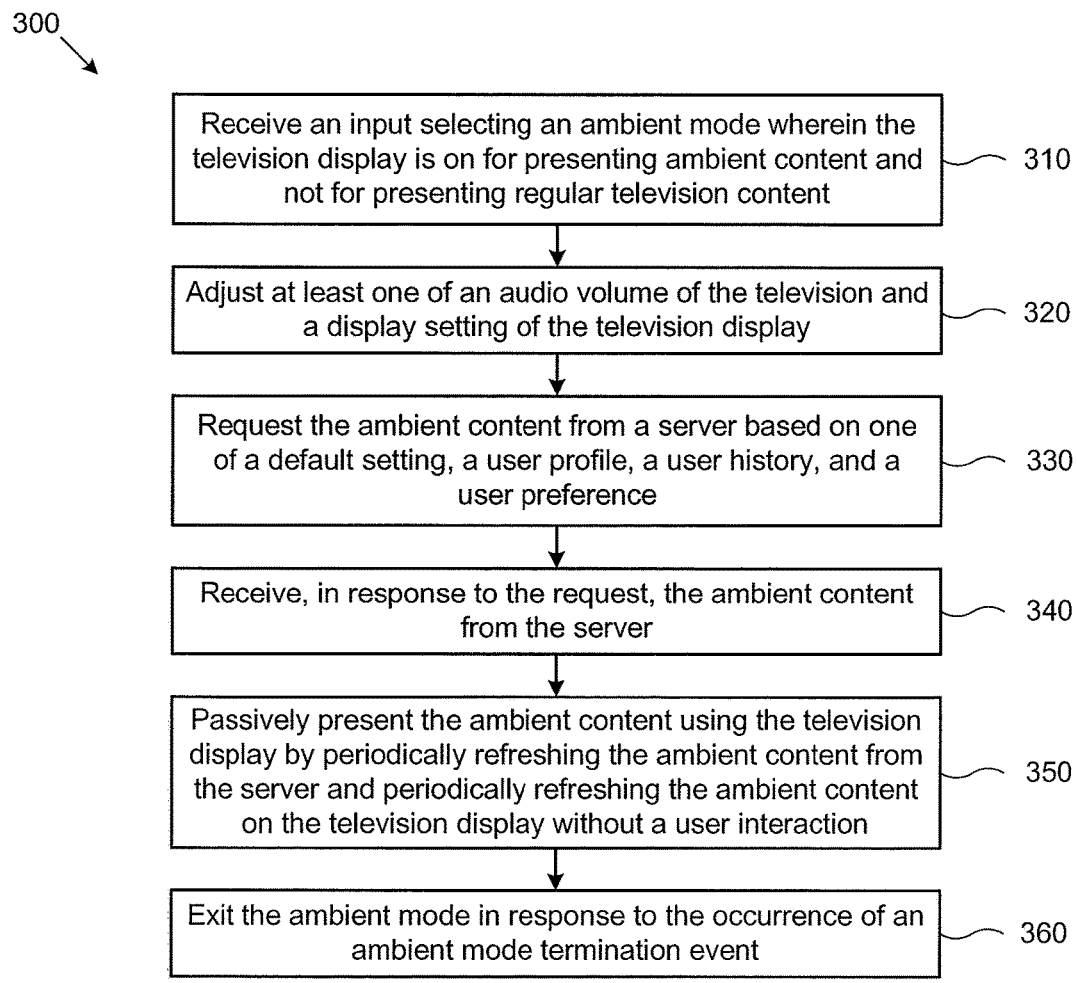
FIG. 3 shows a flowchart illustrating an exemplary method of presenting ambient content on a television display, according to one implementation of the present disclosure.

FIG. 3 shows a flowchart illustrating an exemplary method of presenting ambient content 103 on display 190, according to one implementation of the present disclosure. Method 300 begins at 310, where executable code 140 receives an input selecting an ambient mode wherein display 190 is on for presenting ambient content 103 and not for presenting regular television content or programming by tuning the television to a particular television channel. Ambient mode may be a mode in which an application running on television 110 presents ambient information using television 110 when television 110 is not being used in a normal television mode, but is not powered off. Ambient mode may allow television 110 to be used as a passive source for ambient information when television 110 is not in normal use for television content. Ambient mode may be considered a passive source in that ambient mode module 141 may periodically refresh and/or update ambient content 103 without input or interaction from a user.

In one implementation, the input selecting ambient mode may be an active input, such as a user using input device 195 to select ambient mode from a menu or by selecting an ambient mode option on input device 195 or by using a voice command, a ping or a flash that may be repeated for a duration to select or exit ambient mode. When the user selects the ambient mode, television 110 may stop presenting normal television content, which may include programmed television content, recorded television content, such as digital video recorder (DVR) content, etc. In another implementation, the input selecting the ambient mode may be a passive input, such as when television 110 has not received an interaction from a user and automatically selects ambient mode. The user may also be prompted to receive an active content, a selection of which would cause television 110 to exit ambient mode. In another implementation, television 110 may be programmed to enter ambient mode at a certain time. For example, a user may watch a morning news program each day and begin work at the end of the program. Accordingly, the user may schedule television 110 to enter ambient mode at the end of the morning news program each day. When the news program ends, television 110 will transition from the normal television mode into ambient mode and provide ambient content 103 while the user works.

At 320, executable code 140 adjusts at least one of an audio volume of television 110 and a display setting of display 190. Adjustments to audio and display settings may depend on whether television 110 is transitioning from a lower power mode up into ambient mode or transitioning from a higher power mode down into ambient mode. In some implementations, transitioning into ambient mode may include powering down from a normal television mode into ambient mode, or powering down from an active ambient mode to a passive ambient mode. In such implementations, ambient mode module 141 may adjust a volume setting of television 110 by reducing the volume currently playing on television 110, reducing a maximum volume setting for television 110, muting the audio of television 110, etc. Adjusting the display settings of television 110 may include reducing the brightness of display 190, displaying an ambient mode message on display 190, turning off display 190, etc. In other implementations, transitioning up into ambient mode may include powering up from being off or a standby mode into an ambient mode, or from a passive ambient mode into an active ambient mode. In such implementations, ambient mode module 141 may adjust an audio setting of television 110 to turn on the audio, increase the volume of the audio, increase a maximum volume of television 110, etc. Adjusting the display settings of television 110 may include turning display 190 on, increasing the brightness of display 190, etc.

At 330, executable code 140 requests ambient content 103 from server 101 based on one of a default setting, user profiles 131, user preferences 133, and user history 135. In some implementations, ambient mode module 141 may transmit a request to server 101 for content based on a default setting, such as requesting ambient content 103 based on news headlines and the local weather forecast, etc. In other implementations, the request for ambient content 103 may be based on user profiles 131. User profiles 131 may include information about the user, such as the user's age, gender, musical interests, political affiliation, etc. Ambient mode module 141 may request news content, videos, articles, and other content based on user profiles 131.

In one implementation, ambient mode module 141 may request ambient content 103 based on user preferences 133. User preferences 133 may include various areas of interest to the user. In some implementations, user preferences 133 may include areas of interest without providing personal information about the user, such as favorite sports teams of the user, interests of the user, such as international travel, cooking, animal rescue, etc. Ambient mode module 141 may request news content related to the user's interests, information content, such as web content or blog content, related to the user's interests, photos, videos, live video streams, etc., related to the user's interests.

In one implementation, ambient mode module 141 may request ambient content 103 based on user history 135. User history 135 may include a history of programs watched on television 110, programming that elicited an interaction from the user, such as when the user adjusted the volume, either up or down, during a television program, or when the user changed the channel from one television program to another before the end of the first program. Ambient mode module 141 may use such user activity to infer interests of the user and request ambient content 103 related to those interests. Method 300 continues at 340, where executable code 140 receives, in response to the request, ambient content 103 from server 101.

At 350, executable code 140 passively presents ambient content 103 on display 190 by periodically refreshing ambient content 103 from server 101 and periodically refreshing ambient content 103 on display 190 without a user interaction. Ambient mode module 141 may present ambient content 103 including text data, such as headlines and/or news summaries, graphic content, such as images and/or video clips, informational content, such as weather forecasts, etc., on display 190. In some implementations, ambient content 103 displayed on display 190 may be periodically refreshed, such as every thirty (30) seconds, every minute, etc. When the ambient content 103 is refreshed, ambient mode module 141 may transmit a refresh request to server 101 for any new and/or updated ambient content 103. If some or all of the ambient content 103 has been changed or updated, ambient mode module 141 may receive the refreshed ambient content 103 from server 101 and present the refreshed ambient content 103 to the user. In some implementations, ambient content 103 may include audio, such as a clip of a news broadcast, a preview of a new song or music album, etc. Such audio ambient content may be presented to the user using speakers 180.

At 360, executable code 140 exits the ambient mode in response to the occurrence of an ambient mode termination event. In some implementations, an ambient mode termination event may be user interaction, such as the user activating television 110 using input device 195 to view normal television content. In another implementation, the ambient mode termination event may be a user interacting with ambient content 103 displayed on display 190. For example, ambient content 103 may include a headline of a news story that catches the user's attention. The user may select the headline, and ambient mode module 141 may exit ambient mode to allow the user to view television content or internet content related to the selected headline. In one implementation, the ambient mode termination event may be a scheduled event, such as the beginning of a television program.

The user may watch, for example the nightly news each night. Accordingly, the user may schedule television 110 to exit ambient mode each night at the beginning of the news broadcast.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A television system comprising:
   a television display;
   a memory storing an executable code;
   a processor executing the executable code to:
   receive an input selecting an ambient mode from a plurality of modes, including an on mode, an off mode and the ambient mode, wherein in the ambient mode the television display is on for presenting ambient content and not for presenting regular television content;
   request the ambient content from a server based on one of a default setting, a user profile, a user history, and a user preference;
   receive, in response to the request, the ambient content from the server;
   passively present the ambient content on the television display by periodically refreshing the ambient content from the server and periodically refreshing the ambient content on the television display without a user interaction;
   exit the ambient mode and enter the on mode, in response to an ambient mode termination event and without user interaction, the ambient mode termination event being at least one of a breaking news event and a beginning of a scheduled television program; and
   play, after exiting the ambient mode and entering the on mode, the at least one of the breaking news event and the beginning of the scheduled television program, in the on mode, on the television display.

2. The television system of claim 1, wherein the processor further adjusts, in response to receiving the input, an audio setting and a display setting of the television system, and wherein adjusting the audio setting and the display setting comprises increasing the audio setting and the display setting when transitioning from the off mode and decreasing the audio setting and the display setting when transitioning from the on mode to the ambient mode.

3. The television system of claim 1, wherein the input selecting the ambient mode is one of an active input and a passive input.

4. The television system of claim 1, wherein the input selecting the ambient mode is one of powering the system up into the ambient mode and powering the system down into the ambient mode.

5. The television system of claim 1, wherein the ambient mode includes an active ambient mode and an inactive ambient mode.

6. The television system of claim 1, wherein entering ambient mode includes adjusting one or more settings of the system to passively present the ambient information to a user.

7. The television system of claim 1, wherein the ambient mode termination event includes the beginning of the scheduled television program.

8. The television system of claim 1, wherein the input selecting the ambient mode is generated in response to an end of a second scheduled television program.

9. The television system of claim 1, wherein passively presenting ambient content includes displaying an icon on the television display notifying a user of an event.

10. A method for use with a television including a television display, a non-transitory memory, and a hardware processor, the method comprising:
receiving, using the hardware processor, an input selecting an ambient mode from a plurality of modes, including an on mode, an off mode and the ambient mode, wherein in the ambient mode the television display is on for presenting ambient content and not for presenting regular television content;
requesting, using the hardware processor, the ambient content from a server based on one of a default setting, a user profile, a user history, and a user preference;
receiving, using the hardware processor and in response to the requesting, the ambient content from the server;
passively presenting the ambient content on the television display by periodically refreshing the ambient content from the server and periodically refreshing the ambient content on the television display without a user interaction;
exiting the ambient mode and entering the on mode, in response to an ambient mode termination event and without user interaction, the ambient mode termination event being at least one of a breaking news event and a beginning of a scheduled television program; and
playing, after exiting the ambient mode and entering the on mode, the at least one of the breaking news event and the beginning of the scheduled television program, in the on mode, on the television display.

11. The method of claim 10 further comprising adjusting, in response to receiving the input, an audio setting and a display setting of the television, wherein adjusting the audio setting and the display setting comprises increasing the audio setting and the display setting when transitioning from the off mode and decreasing the audio setting and the display setting when transitioning from the on mode to the ambient mode.

12. The method of claim 10, wherein the input selecting the ambient mode is one of an active input and a passive input.

13. The method of claim 10, wherein the input selecting the ambient mode is one of powering the system up into the ambient mode and powering the system down into the ambient mode.

14. The method of claim 10, wherein the ambient mode includes an active ambient mode and an inactive ambient mode.

15. The method of claim 10, wherein entering ambient mode includes adjusting one or more settings of the system to passively present the ambient information to a user.

16. The method of claim 10, wherein passively presenting ambient content includes displaying an icon on the television display notifying a user of an event.

17. The method of claim 10, wherein the ambient mode termination event includes the beginning of the scheduled television program.

18. The method of claim 10, wherein the input selecting the ambient mode is generated in response to an end of a second scheduled television program.

19. A television system comprising:
a television display;
a memory storing an executable code;
a processor executing the executable code to:
receive an input selecting an ambient mode from a plurality of modes, including an on mode, an off mode and the ambient mode, wherein in the ambient mode the television display is on for presenting ambient content and not for presenting regular television content;
request the ambient content from a server based on one of a default setting, a user profile, a user history, and a user preference;
receive, in response to the request, the ambient content from the server;
passively present the ambient content on the television display by periodically refreshing the ambient content from the server and periodically refreshing the ambient content on the television display without a user interaction;
exit the ambient mode and enter the on mode, in response to an ambient mode termination event and without user interaction, the ambient mode termination event being a beginning of a scheduled television program; and
play, after exiting the ambient mode and entering the on mode in response to the ambient mode termination event, the scheduled television program, in the on mode, on the television display.

20. The television system of claim 19, wherein the processor further adjusts, in response to receiving the input, an audio setting and a display setting of the television system, and wherein adjusting the audio setting and the display setting comprises increasing the audio setting and the display setting when transitioning from the off mode and decreasing the audio setting and the display setting when transitioning from the on mode to the ambient mode.

* * * * *